United States Patent Office 2,786,825
Patented Mar. 26, 1957

2,786,825

PROCESS FOR THE PREPARATION OF CATIONIC POLYALKYLENE MODIFIED UREA-FORMALDEHYDE RESINS

Gerald I. Keim, Oxford, Pa., assignor to Hercules Powder Company, Wilmington, Del., a corporation of Delaware No Drawing. Application October 12, 1953,
Serial No. 385,693

4 Claims. (Cl. 260—70)

This invention relates in general to a cationic urea-formaldehyde resin and a process for producing the resin.

An important problem in the manufacture of paper has been the preparation of a wet strength paper whereby the paper is resistant to tearing or breaking even when wet. This property of increased strength and particularly wet strength has been imparted to the paper through the incorporation in the paper furnish of a urea-formaldehyde resin, but previously the incorporation of such a resin in the paper furnish has been accomplished by precipitating the resin or by utilizing a resin which has been partly polymerized and which is characterized by being in the gel state or nearly in the gel state with the result that the urea-formaldehyde resin is mechanically entrained on the paper fibers.

More recently, high wet strength and dry strength paper products have been prepared by the addition thereto of a partially polymerized hydrophilic cationic urea-formaldehyde resin which contains as a modifier a polyalkylenepolyamine. A description of these resins is contained in my copending application Serial No. 341,889, filed March 12, 1953. These modified resins are substantive to the paper fibers, i. e., they are characterized by substantial exhaustion onto the paper fibers and even distribution thereon without the need of addition of a precipitating or fixing agent. The use of such resins leads to a process for preparing a paper of extraordinarily high wet strength by a practicable process easily adaptable to existing paper machinery.

In making these paper-treating resins, there are employed from about 1.90 to about 2.10 moles of formaldehyde to 0.90 mole of urea. The optimum ratio of formaldehyde to urea is about 2.0 moles of formaldehyde to about 0.90 mole of urea. The polyalkylenepolyamine is generally employed in the amount of from about 3% to about 30% by weight based on the urea and preferably in the amount of from about 7% to about 22% by weight based on the urea.

The polyalkylenepolyamines used as modifiers of these cationic urea-formaldehyde resins have the general formula $H_2N(C_nH_{2n}HN)_xH$ where $n$ is two or more and $x$ is two or more. Examples of the aforesaid polyalkylenepolyamines are diethylenetriamine, triethylenetetramine, tetraethylenepentamine, pentaethylenehexamine, the corresponding polypropylenepolyamines, the corresponding polybutylenepolyamines, etc.

It is preferred to heat all the ingredients together for a short period of time under alkaline conditions and then for a relatively long period of time under acid conditions until a resin sirup of the desired viscosity is formed. If desired, the alkaline reaction can be omitted and the entire reaction carried out under acid conditions. An alternative procedure for making the resins involves reacting urea and formaldehyde under alkaline conditions followed by addition of the water-soluble polyfunctional organic nitrogen base and reaction under acid conditions until a resin having the desired viscosity is achieved. The resins so produced should have a viscosity, when measured at 25° C. on a 44% solids solution, of from about K on the Gardner-Holdt scale to just short of gelation. It is preferred that the resin have a viscosity of from about T to about Z when measured at 25° C. on the Gardner-Holdt scale.

These resins, while representing a great advance over the prior art in flexibility of use on the paper machine and in the quality of the product produced, nevertheless suffer a very serious drawback in that they are characterized by the fact that not more than about 50% of the resin is retained by the paper when the resin is added to the water suspension of paper stock, i. e., at any point of the papermaking machine ahead of the wire or screen. As this is the principal method used commercially to incorporate these resins in paper, this is a serious drawback. Recirculating the white water has not proved a satisfactory answer. Thus, it is necessary to run part of the white water to the sewer in order to prevent the accumulation of dissolved substances in the paper mill systems. These substances, if allowed to accumulate indefinitely, tend to cause trouble with foaming, slime growth, poor sizing and sticking on the press rolls. In addition, it has been found that recirculation of the white water does not result in any saving of the urea-formaldehyde resin as would be expected from the amounts of resin present in the white water.

Now in accordance with the present invention there has been discovered a cationic polyalkylenepolyamine-modified urea-formaldehyde resin which is substantially completely retained by the paper when added to a water suspension of paper fibers and a process for producing this resin. It is possible by using the resins of the instant invention to obtain the same wet strength as obtained with the prior art cationic polyalkylenepolyamine-modified urea-formaldehyde resins with the use of only about one-half the amount of the instant resins as was necessary with the prior art resins. Conversely, it is possible to obtain approximately a 30% increase in wet strength by using the same amount of the instant resin to treat paper as of the prior art resins.

These highly efficient cationic urea-formaldehyde resins are prepared by cooling an aqueous solution of the cationic polyalkylenepolyamine-modified urea-formaldehyde resin produced as set forth above to lower the temperature of the resin solution at least to about 10° C. It is preferred to lower the temperature to anywhere from about the freezing point of the resin solution up to about 5° C. As a result of this treatment, a fraction of the original resin is precipitated. This precipitate may be separated by any of the processes known to those skilled in the art such as filtering, centrifuging or allowing the precipitate to settle and either decanting the supernatant liquid or draining off the lower layer. The resin so separated has been found to be substantially completely retained on the paper fibers when used in the so-called beater addition process. The yield of precipitate may be varied from about 20% to about 70% of the starting resin solids by varying the temperature or the concentration or the composition of the starting cationic resin.

The filtrate which contains the unprecipitated resin may be treated to produce further amounts of cationic urea-formaldehyde resin which may then be treated in accordance with this invention. Thus, the filtrate may be concentrated to about 40% to about 50% solids with about 43% to about 45% solids preferred, and the ratio of urea to formaldehyde adjusted to the desired value. This solution may then be polymerized in a manner similar to that used in preparing the original resin either with or without adding a fresh charge of urea, formaldehyde, and polyalkylenepolyamine modifier to the concentrated filtrate.

An alternative method of recovering the resin values in the filtrate, while avoiding the evaporation of water, is to add to the filtrate a concentrated form of formaldehyde, such as paraformaldehyde, dimethylurea or a concentrated solution of formaldehyde which has been stabilized with urea (such a solution is marketed by the E. I. du Pont de Nemours & Company under the trade name of "Arboneeld B"). Sufficient urea is added along with the formaldehyde to maintain the desired urea to formaldehyde ratio. By this means the solution is adjusted to about 40% to about 50% solids, with from about 43% to about 45% solids preferred. Additional amounts of the polyalkylenepolyamine modifier are added and the solution is polymerized in a manner similar to that used in preparing the original resin.

It has been found that the resins obtained by reworking the unprecipitated fractions produced in the process of the instant invention give approximately the same proportion of precipitated resin when processed in the instant process as do those resins which do not contain any reworked fractions. Thus, substantially none of the cationic modified urea-formaldehyde resin is lost either in producing the more highly efficient resins of the instant invention or in the papermaking process wherein the resin is used to produce a paper of exceptionally high wet strength.

The nature of the resin produced by the process of the instant invention is not fully known. However, it is known that the resin is cationic and has the highly unusual property of being substantially completely retained by the paper fibers.

The general nature and form of the invention having been set forth and described the following example is presented in illustration but not in limitation of the invention. All parts and percentages are by weight unless otherwise specified. Where no temperature is specified, room temperature was used.

*Example*

A solution was prepared containing 216 parts of urea, 620 parts of 37% formaldehyde which was methanol-free, and 29.2 parts of triethylenetetramine. The pH of the resulting solution was 10.2. This solution was refluxed for 5 minutes and then cooled to 85° C. There were then added 15 parts of a 90% formic acid solution and the solution heated to 90° C. The pH at this stage was 4.5. The resin was held at 90° C. until its viscosity reached U–V on the Gardner-Holdt scale as determined on a 45% solids solution at 25° C. The solution was then cooled, neutralized with sodium hydroxide to stop further polymerization and diluted with 300 parts of water to give a solution having 33% solids. A portion of this resin solution was used as a control. Another portion of this solution consisting of 250 parts was mixed with 250 parts of ice. This mixture was stirred and a viscous, gummy precipitate settled out. The upper layer was decanted to leave 230 parts of viscous dispersion which contained 24.6% solids. This equaled 56.5 parts of dry resin which represented a 69% yield of the resin solids based on the original resin.

A bleached sulfite pulp was beaten to a Schopper-Riegler freeness of 750 cc. The slush stock was adjusted to a pH of 4.5 by the addition of papermaker's alum and then 3% by weight of the precipitated resin (solids basis) obtained as above, based on the dry weight of the pulp was added. Handsheets with a basis weight of 40 lb./ream were formed from the treated pulp using a Noble and Wood handsheet machine. Control sheets were formed by the identical process using the untreated portion of the triethylenetetramine-modified urea-formaldehyde resin. All handsheets were dried on a rotary drier to a moisture content of 5%. The sheets were then cured for one hour at 105° C. The sheets were soaked in distilled water for two hours and then tested for wet tensile strength. The sheets were then tested for wet strength with the following results:

| | Wet tensile strength |
|---|---|
| Sheet containing control resin | lb./in 5.3 |
| Sheet containing treated resin | lb./in 8.5 |

The quantity of highly efficient cationic polyalkylenepolyamine-modified urea-formaldehyde resin obtained in accordance with the instant invention may be increased by (1) diluting the resin solution to a lower solids content; (2) using the lowest possible temperature; and (3) varying the composition of the resin to render it less soluble in water. Thus, any of the changes in the formulation known to those skilled in the art to lower the solubility of the resulting solution may be used. For instance, using a lower amount of formaldehyde to urea, using a smaller amount of modifier, or using a lower temperature for the polymerization, all result in a resin which is less soluble in water and therefore capable of greater yields in the process of the instant invention.

The concentration of the resin solution which is to be fractionated may vary widely. In general, any concentration between the maximum solubility of the resin and the maximum amount of water which would be economical to handle may be used. Generally, it is preferred to use a concentration between that at which the resin is produced (about 45% solids by weight) and about 1% solids by weight.

The highly efficient wet strength resins of the present invention may be used as such to prepare paper having high wet strength or they may be blended with any of the prior art cationic wet strength resins to produce a product of improved efficiency.

I claim:

1. A process for treating a hydrophilic cationic polyalkylenepolyamine-modified urea-formaldehyde resin to form a resin of improved properties in producing wet strength paper which comprises forming an aqueous solution of such a urea-formaldehyde resin in which the polyalkylene polyamine modifier has the formula $$H_2N(C_nH_{2n}HN)_xH$$

where $n$ is 2 or more and $x$ is 2 or more, the amount of said polyalkylene polyamine modifier being from about 3% to about 30% of the weight of the urea, cooling the solution of the said resin to a temperature between the freezing point thereof and about 10° C., and separating the resulting precipitate.

2. A process according to claim 1 wherein the polyalkylenepolyamine is diethylenetriamine.

3. A process according to claim 1 wherein the polyalkylenepolyamine is triethylenetetramine.

4. The process according to claim 1 wherein the polyalkylenepolyamine is tetraethylenepentamine.

References Cited in the file of this patent

UNITED STATES PATENTS

| 2,554,475 | Suen | May 22, 1951 |
| 2,601,598 | Daniel | June 24, 1952 |
| 2,616,874 | Yost | Nov. 4, 1952 |

FOREIGN PATENTS

| 397,909 | Great Britain | Sept. 4, 1933 |